(12) United States Patent
Toshioka et al.

(10) Patent No.: US 8,074,446 B2
(45) Date of Patent: Dec. 13, 2011

(54) EXHAUST GAS PURIFICATION SYSTEM FOR INTERNAL COMBUSTION ENGINE

(75) Inventors: Shunsuke Toshioka, Susono (JP);
Takamitsu Asanuma, Mishima (JP);
Morio Narita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 554 days.

(21) Appl. No.: 12/227,376

(22) PCT Filed: Jul. 12, 2007

(86) PCT No.: PCT/JP2007/064291
§ 371 (c)(1),
(2), (4) Date: Nov. 14, 2008

(87) PCT Pub. No.: WO2008/007810
PCT Pub. Date: Jan. 17, 2008

(65) Prior Publication Data
US 2009/0151332 A1 Jun. 18, 2009

(30) Foreign Application Priority Data
Jul. 12, 2006 (JP) .................. 2006-191383

(51) Int. Cl.
*F01N 3/00* (2006.01)
(52) U.S. Cl. ............. 60/286; 60/274; 60/277; 60/295; 60/301
(58) Field of Classification Search .......... 60/274, 60/284–289, 295–301
See application file for complete search history.

(56) References Cited

U.S. PATENT DOCUMENTS
5,445,019 A * 8/1995 Glidewell et al. .......... 73/114.51
(Continued)

FOREIGN PATENT DOCUMENTS
EP 1 176 289 A2 1/2002
(Continued)

OTHER PUBLICATIONS

Dec. 9, 2009 Office Action issued in Japanese Patent Application No. 2006-191383 (with English translation).

*Primary Examiner* — Thomas Denion
*Assistant Examiner* — Jesse Bogue
(74) *Attorney, Agent, or Firm* — Oliff & Berridge, PLC (57) ABSTRACT

The task for the present invention is to reduce more of an oxide that is stored in a NOx storage reduction catalyst, even in a case where a clogging has occurred in a reducing agent adding valve that is provided in an exhaust passage of an internal combustion engine. The present invention is provided with rich spike control performing means that, when an oxide that is stored in the NOx storage reduction catalyst is reduced, performs a rich spike control and that, when lowering the air-fuel ratio in the exhaust gas, performs addition of a reducing agent by the reducing agent adding valve multiple times, which is performed when a crank angle of the internal combustion engine is in a specified range. When the clogging has occurred in the reducing agent adding valve, the number of times the air-fuel ratio in the exhaust gas is lowered while the rich spike control is being performed by the rich spike control performing means is increased.

3 Claims, 4 Drawing Sheets

U.S. PATENT DOCUMENTS

| | | | |
|---|---|---|---|
| 6,314,722 B1 * | 11/2001 | Matros et al. ............... 60/274 |
| 6,487,852 B1 * | 12/2002 | Murphy et al. .............. 60/286 |
| 6,619,035 B2 | 9/2003 | Matsuoka et al. |
| 6,932,069 B2 | 8/2005 | Suyama et al. |
| 6,983,589 B2 * | 1/2006 | Lewis et al. ................. 60/277 |
| 7,257,941 B1 * | 8/2007 | Reuter ........................ 60/277 |
| 7,905,085 B2 * | 3/2011 | Henning et al. ............ 60/277 |
| 2004/0128982 A1 * | 7/2004 | Patchett et al. ............. 60/274 |
| 2009/0049826 A1 * | 2/2009 | Toshioka et al. ............ 60/286 |

FOREIGN PATENT DOCUMENTS

| | | |
|---|---|---|
| EP | 1 176 295 A2 | 1/2002 |
| EP | 1 331 373 A2 | 7/2003 |
| JP | A 2002-38926 | 2/2002 |
| JP | A 2002-106332 | 4/2002 |
| JP | A 2003-286878 | 10/2003 |
| JP | A 2005-248760 | 9/2005 |
| JP | 2005-344682 * | 12/2005 |
| JP | A-2005-344682 | 12/2005 |

* cited by examiner

EXHAUST GAS PURIFICATION SYSTEM FOR INTERNAL COMBUSTION ENGINE

This application is the national phase application under 35 U.S.C. §371 of PCT international application No. PCT/JP2007/064291 filed on 12 Jul., 2007, which claims priority to Japanese patent application No. 2006-191383 filed on 12 Jul. 2006, the contents of which are incorporated herein by reference.

TECHNICAL FIELD

The present invention relates to an exhaust gas purification system for an internal combustion engine, in which system a NOx storage reduction catalyst is provided that is installed in an exhaust passage of the internal combustion engine.

PRIOR ART

In an exhaust gas purification system for an internal combustion engine, in which system is provided a NOx storage reduction catalyst (hereinafter called the "NOx catalyst") that is installed in an exhaust passage of the internal combustion engine, NOx in the exhaust gas is stored in the NOx catalyst when the air-fuel ratio in the exhaust gas is comparatively high and the atmosphere surrounding the NOx catalyst is an oxidizing atmosphere. At this time, SOx in the exhaust gas is also stored in the NOx catalyst.

When the oxides (NOx and SOx) that are thus stored in the NOx catalyst are reduced, there are cases where a so-called rich spike control is performed that, in comparatively short cycles, repeatedly lowers the air-fuel ratio in the exhaust gas that flows into the NOx catalyst to a target air-fuel ratio that is set as the air-fuel ratio at which the oxides that are the objects of the reduction become reducible.

In this type of the rich spike control, a technology is known that lowers the air-fuel ratio in the exhaust gas that flows into the NOx catalyst to the target air-fuel ratio by adding a reducing agent to the exhaust gas multiple times by a reducing agent adding valve that is installed in the exhaust passage on the upstream side of the NOx catalyst. In Japanese Patent Application Laid-Open No. 2002-106332, a technology is also disclosed in which, in this type of the rich spike control, the addition of the reducing agent is synchronized to the crank angle of the internal combustion engine such that the addition of the reducing agent is performed when an exhaust gas valve is open. Technologies that are related to the rich spike control are also described in Japanese Patent Application Laid-Open No. 2003-286878, Japanese Patent Application Laid-Open No. 2005-248760, and Japanese Patent Application Laid-Open No. 2002-38926.

In the reducing agent adding valve, a clogging sometimes occurs due to reducing agent adhesion and the like. When this sort of clogging of the reducing agent adding valve occurs, it decreases the amount of the reducing agent that is added by the reducing agent adding valve per unit time (hereinafter called the "unit added amount") while the rich spike control is being performed. In these cases, the air-fuel ratio in the exhaust gas does not lower to the target air-fuel ratio even if the reducing agent is added by the reducing agent adding valve, as the result, there is a possibility that the oxides that are stored in the NOx catalyst may not be sufficiently reduced.

Accordingly, a technology is known that, in a case where the clogging of the reducing agent adding valve occurs and the unit added amount is decreased, lengthens the period (hereinafter called simply the "adding period") during which the reducing agent is added in each time of multiple times in which the reducing agent is added by the reducing agent adding valve in order to lower the air-fuel ratio in the exhaust gas in the rich spike control. This makes it possible to suppress the decrease in the amount of the reducing agent that is added by the reducing agent adding valve during the time that the air-fuel ratio in the exhaust gas is lowered. That is, the technology makes it possible to lower the air-fuel ratio in the exhaust gas to a lower value.

However, in a case where the addition of the reducing agent by the reducing agent adding valve is synchronized to the crank angle of the internal combustion engine, the adding period is limited by the crank angle of the internal combustion engine. That is, there is an upper limit value for the adding period. Moreover, there are cases where the amount of the reducing agent that is added is insufficient, even if the adding period is extended to the upper limit value, and the air-fuel ratio in the exhaust gas does not lower to the target air-fuel ratio.

DISCLOSURE OF THE INVENTION

In light of the problems described above, it is an object of the present invention to provide a technology that makes it possible to reduce more of an oxide that is stored in a NOx catalyst, even in a case where a clogging of a reducing agent adding valve has occurred.

When the clogging occurs in the reducing agent adding valve, the present invention increases a number of times in which an air-fuel ratio in exhaust gas is lowered while a rich spike control is being performed.

More specifically, an exhaust gas purification system for an internal combustion engine characterized by;

a NOx storage reduction catalyst that is provided in an exhaust passage of said internal combustion engine;

a reducing agent adding valve that is provided in said exhaust passage on an upstream side of said NOx storage reduction catalyst and that adds a reducing agent to exhaust gas;

rich spike control performing unit that, when an oxide that is stored in said NOx storage reduction catalyst is reduced, performs a rich spike control that cyclically lowers an air-fuel ratio in the exhaust gas that flows into said NOx storage reduction catalyst to a target air-fuel ratio and that, when lowering the air-fuel ratio in the exhaust gas, performs addition of the reducing agent by said reducing agent adding valve that is performed when a crank angle of said internal combustion engine is in a specified range multiple times; and adding valve clogging judgment unit that determines whether or not a clogging of said reducing agent adding valve has occurred, wherein when said adding valve clogging judgment unit determines that the clogging has occurred in said reducing agent adding valve, the number of times the air-fuel ratio in the exhaust gas is lowered while the rich spike control is being performed by said rich spike control performing unit is increased.

Here, the specified range for the crank angle is a range in which it is possible to cause the reducing agent to reach the NOx catalyst suitably by using the reducing agent adding valve to add the reducing agent when the crank angle of the internal combustion engine is in the specified range. The specified range is determined in advance by experimentation and the like.

Increasing the number of times the reducing agent is added multiple times by the reducing agent adding valve while the rich spike control is being performed makes it possible to increase the number of times the air-fuel ratio in the exhaust gas is lowered. This makes it possible to increase the total amount of the reducing agent that is added by the reducing agent adding valve while the rich spike control is being performed.

In other words, according to the present invention, it is possible to suppress decrease in the amount of the reducing agent that is supplied to the NOx catalyst, even in a case where the clogging of the reducing agent adding valve has occurred and the amount of the reducing agent that is added by the reducing agent adding valve per unit time (hereinafter called the "unit added amount") has decreased. Therefore, it is possible to reduce more of the oxide that is stored in the NOx catalyst, even in a case where the clogging of the reducing agent adding valve has occurred.

According to the present invention, when the number of times the air-fuel ratio in the exhaust gas is lowered while the rich spike control is being performed is increased, the increase in the number of times may be such that the total amount of the reducing agent that is added by the reducing agent adding valve while the rich spike control is being performed is approximately the same as the total amount of the reducing agent that is added in a case where the rich spike control is performed in a state in which the clogging of the reducing agent adding valve has not occurred.

This makes it possible to supply to the NOx catalyst approximately the same amount of the reducing agent as in the case where the rich spike control is performed in the state in which the clogging of the reducing agent adding valve has not occurred, even in the case where the clogging of the reducing agent adding valve has occurred. Accordingly, the NOx that is stored in the NOx catalyst can be reduced to the same extent as in the case where the rich spike control is performed in the state in which the clogging of the fuel adding valve has not occurred.

According to the present invention, when the number of times the air-fuel ratio in the exhaust gas is lowered while the rich spike control is being performed is increased, a period during which the lowering of the air-fuel ratio in the exhaust gas is suspended, that is, a period during which the adding of the reducing agent multiple times by the reducing agent adding valve is suspended, while the rich spike control is being performed may be shortened.

This makes it possible to suppress lengthening of the period during which the rich spike control is performed, even in a case where the number of times the air-fuel ratio in the exhaust gas is lowered while the rich spike control is being performed is increased.

According to the present invention, adding period lengthening unit may be provided that, in a case where the adding valve clogging judgment unit determines that the clogging of the reducing agent adding valve has occurred, lengthens the period during which the reducing agent is added by the reducing agent adding valve in each time when the air-fuel ratio in the exhaust gas is lowered while the rich spike control is being performed. However, in the present invention, the adding of the reducing agent by the reducing agent adding valve is done when the crank angle of the internal combustion engine is in the specified range. Accordingly, the length of the period during which the crank angle of the internal combustion engine is in the specified range serves, of necessity, as an upper limit value for the period during which the reducing agent is added by the reducing agent adding valve in each time.

Therefore, if the configuration described above is used, in a case where the total amount of the reducing agent that is added by the reducing agent adding valve while the rich spike control is being performed does not reach the total amount of the reducing agent that is added in the case where the rich spike control is performed in the state in which the clogging of the reducing agent adding valve has not occurred, the number of times over which the air-fuel ratio in the exhaust gas is lowered while the rich spike control is being performed may be increased, even if the period during which the reducing agent is added by the reducing agent adding valve in each time when the air-fuel ratio in the exhaust gas is lowered while the rich spike control is being performed is lengthened to an upper limit value by the adding period lengthening unit.

This makes it possible for the air-fuel ratio in the exhaust gas to be brought as close as possible to the target air-fuel ratio while the rich spike control is being performed, even in the case where the clogging of the reducing agent adding valve had occurred. Accordingly, more of the oxide that is stored in the NOx catalyst can be reduced, even as the number of additional times that are added to the number of times over which the air-fuel ratio in the exhaust gas is lowered in the rich spike control is suppressed.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

A specific embodiment of an exhaust gas purification system for an internal combustion engine according to the present invention will be explained below with reference to the drawings.

Figure 1:
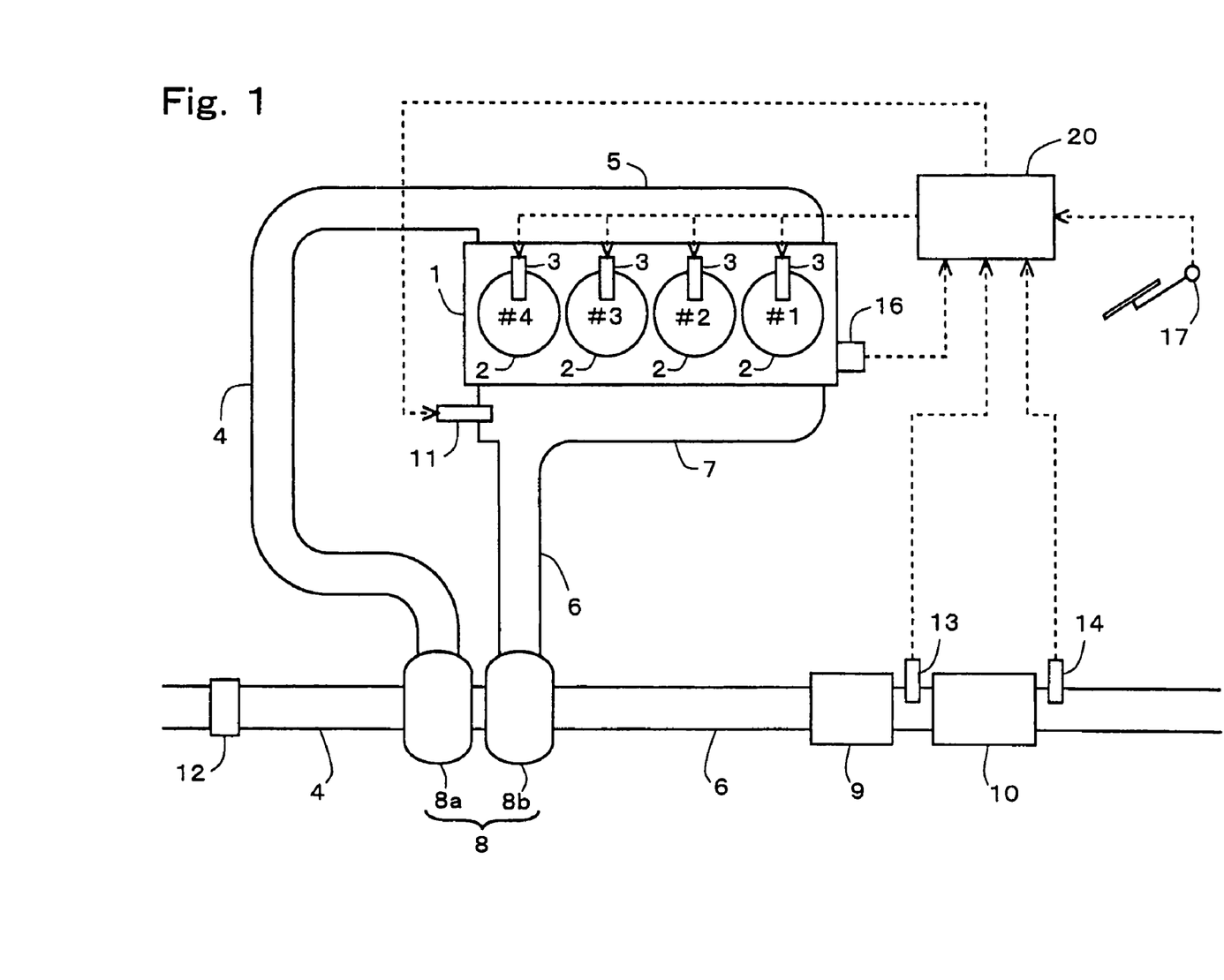
FIG. 1 is a schematic drawing that shows an internal combustion engine and its intake and exhaust systems according to an embodiment.

FIG. 1 is a schematic drawing that shows the internal combustion engine and its intake and exhaust systems according to the embodiment. An internal combustion engine 1 is a diesel engine that is used to drive a vehicle and has four cylinders 2. Each of cylinders 2 is provided with a fuel injection valve 3 that injects fuel directly into the cylinder 2.

An intake manifold 5 and an exhaust manifold 7 are connected to the internal combustion engine 1. One end of an intake passage 4 is connected to the intake manifold 5. One end of an exhaust passage 6 is connected to the exhaust manifold 7. The exhaust passage 6 is connected to the exhaust manifold 7 in a position close to a cylinder No. 4.

A compressor 8a of a turbocharger (supercharger) 8 is arranged in the intake passage 4. A turbine 8b of the turbocharger 8 is arranged in the exhaust passage 6. An air flow meter 12 is provided in the intake passage 4 on the upstream side of the compressor 8a.

An oxidation catalyst 9 is provided in the exhaust passage 6 on the downstream side of the turbine 8b. In addition, a NOx catalyst 10 is provided in the exhaust passage 6 on the downstream side of the oxidation catalyst 9. A temperature sensor 13 that detects the temperature of the exhaust gas is provided in the exhaust passage 6 between the oxidation catalyst 9 and the NOx catalyst 10. A NOx concentration sensor 14 that detects. the concentration of NOx in the exhaust gas is also provided in the exhaust passage 6 on the downstream side of the NOx catalyst 10.

A fuel adding valve 11 that adds fuel to the exhaust gas as a reducing agent is provided in the exhaust manifold 7 close to the portion where the exhaust passage 6 is connected. Note that in the embodiment, the fuel adding valve 11 corresponds to the reducing agent adding valve in the present invention.

An electronic control unit (ECU) 20 is attached to the internal combustion engine 1. The ECU 20 is a unit that controls the operating state of the internal combustion engine 1. The air flow meter 12, the temperature sensor 13, the NOx concentration sensor 14, a crank position sensor 16, and an accelerator angle sensor 17 are electrically connected to the ECU 20. The crank position sensor 16 detects a crank angle of the internal combustion engine 1. The accelerator angle sensor 17 detects an accelerator angle of the vehicle in which the internal combustion engine 1 is mounted. Output signals from all of the sensors are input to the ECU 20.

The ECU 20 estimates the temperature of the oxidation catalyst 9 based on the detection value of the temperature sensor 13. The ECU 20 also derives the revolution speed of the internal combustion engine 1 based on the detection value of the crank position sensor 16 and derives the load on the internal combustion engine 1 based on the detection value of the accelerator angle sensor 17.

The fuel injection valves 3 and the fuel adding valve 11 are also electrically connected to the ECU 20. They are also controlled by the ECU 20.

In the embodiment, the NOx that is stored in the NOx catalyst 10 is reduced by performing a rich spike control that, in comparatively short cycles, repeatedly lowers the air-fuel ratio in the exhaust gas that flows into the NOx catalyst 10 to a target air-fuel ratio. Here, the target air-fuel ratio is a lower value than an upper limit value for an air-fuel ratio at which it is possible to reduce the NOx that is stored in the NOx catalyst 10. Controlling the air-fuel ratio to the target air-fuel ratio in the exhaust gas makes it possible to supply a sufficient amount of fuel (the reducing agent) to the NOx catalyst 10 to reduce the NOx. The target air-fuel ratio is determined in advance by experimentation and the like.

Figure 2:
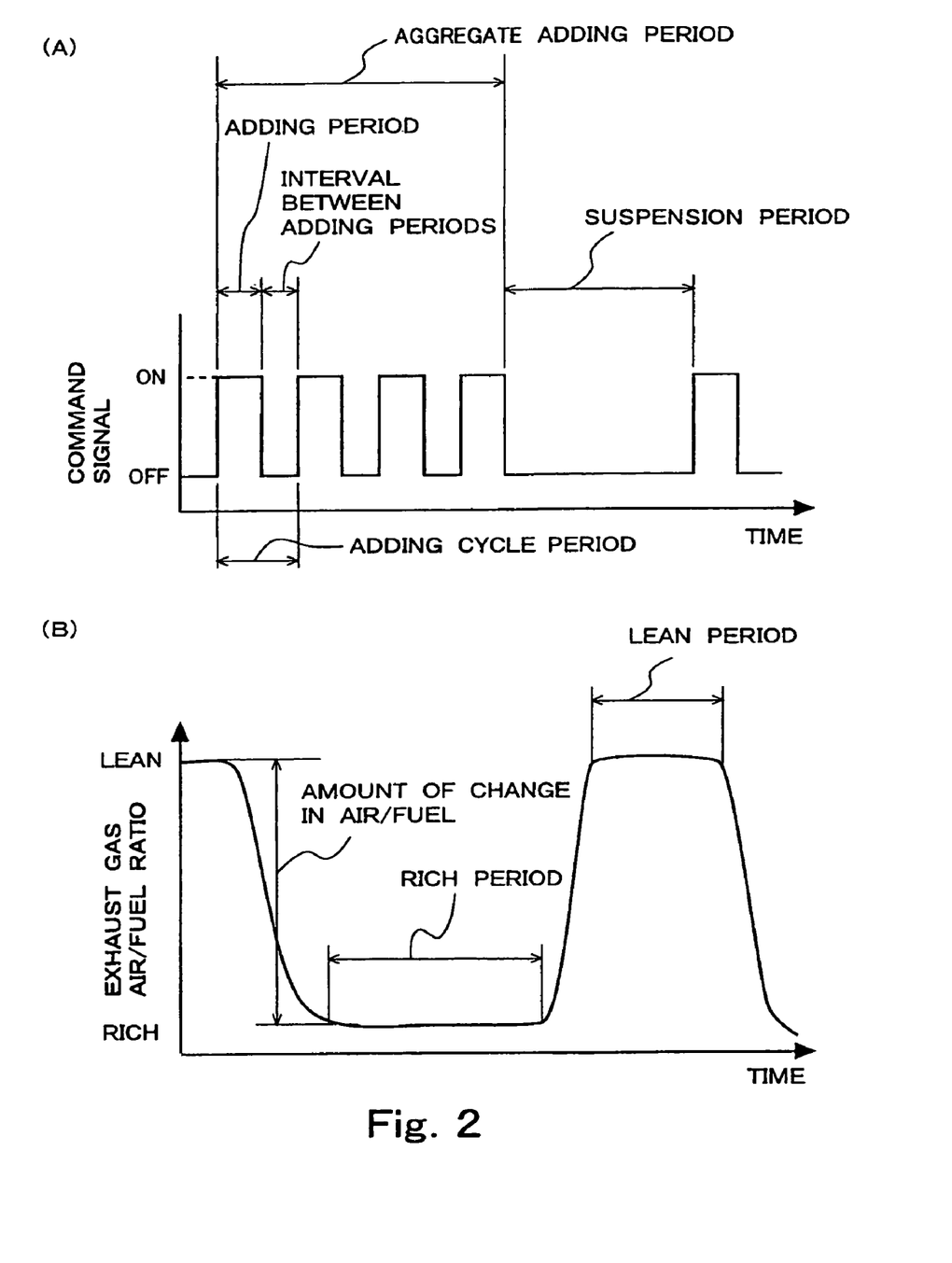
FIG. 2 is time charts that show, on identical time axes, a waveform of an ECU command signal that is sent to a fuel adding valve and changes in an air-fuel ratio in exhaust gas that correspond to the waveform.

The rich spike control according to the embodiment will be explained below with reference to FIG. 2. FIG. 2 is time charts that show, on identical time axes, a waveform of a command signal that is sent from the ECU 20 to the fuel adding valve 11 and changes in the air-fuel ratio in the exhaust gas that correspond to the waveform. FIG. 2A is a time chart that shows changes in the command signal from the ECU 20. FIG. 2B is a time chart that shows changes in the air-fuel ratio in the exhaust gas. Note that in the embodiment, the ECU 20 which performs the rich spike control by sending the command signal that is shown in FIG. 2A to the fuel adding valve 11 corresponds to rich spike control performing unit in the present invention.

The fuel adding valve 11 opens and adds fuel into the exhaust gas when the command signal that is shown in FIG. 2A enters an ON state. As shown in FIG. 2A, the adding of the fuel by the fuel adding valve 11 multiple times causes the air-fuel ratio in the exhaust gas that flows into the NOx catalyst 10 to lower and become rich. Furthermore, when the adding of the fuel by the fuel adding valve 11 multiple times is suspended, the air-fuel ratio in the exhaust gas that flows into the NOx catalyst 10 rises and becomes lean.

Here, a period during which the air-fuel ratio in the exhaust gas is rich is called a rich period, and a period during which the air-fuel ratio in the exhaust gas is lean is called a lean period. Also, a period during which the fuel is added in each time of multiple times in which the fuel is added by the fuel adding valve 11 is called simply an adding period (in the embodiment, the adding period corresponds to the period during which the reducing agent is added by the reducing agent adding valve in each time in the present invention.). The period between one adding period and the next adding period is called an interval between the adding periods. A period that is a combination of the adding period of one time and the subsequent interval between the adding periods of one time (that is, the period from the start of one adding period to the start of the next adding period) is called an adding cycle period. A period during which the fuel adding valve 11 adds fuel multiple times is called an aggregate adding period, and a period during which the adding of fuel multiple times is suspended is called a suspension period.

In the rich spike control, the longer the adding period becomes, the larger the amount of fuel that is added to the exhaust gas by the fuel adding in one time becomes. Therefore, the air-fuel ratio in the exhaust gas during the rich period can be lowered by making lengthen the adding period. Note that in the rich spike control, the number of fuel adding times that are executed to create a single rich period (that is, the number of times of the adding periods in a single aggregate adding period) is determined in advance. (In the embodiment, the number of times is 4, as shown in FIG. 2.)

Figure 3:
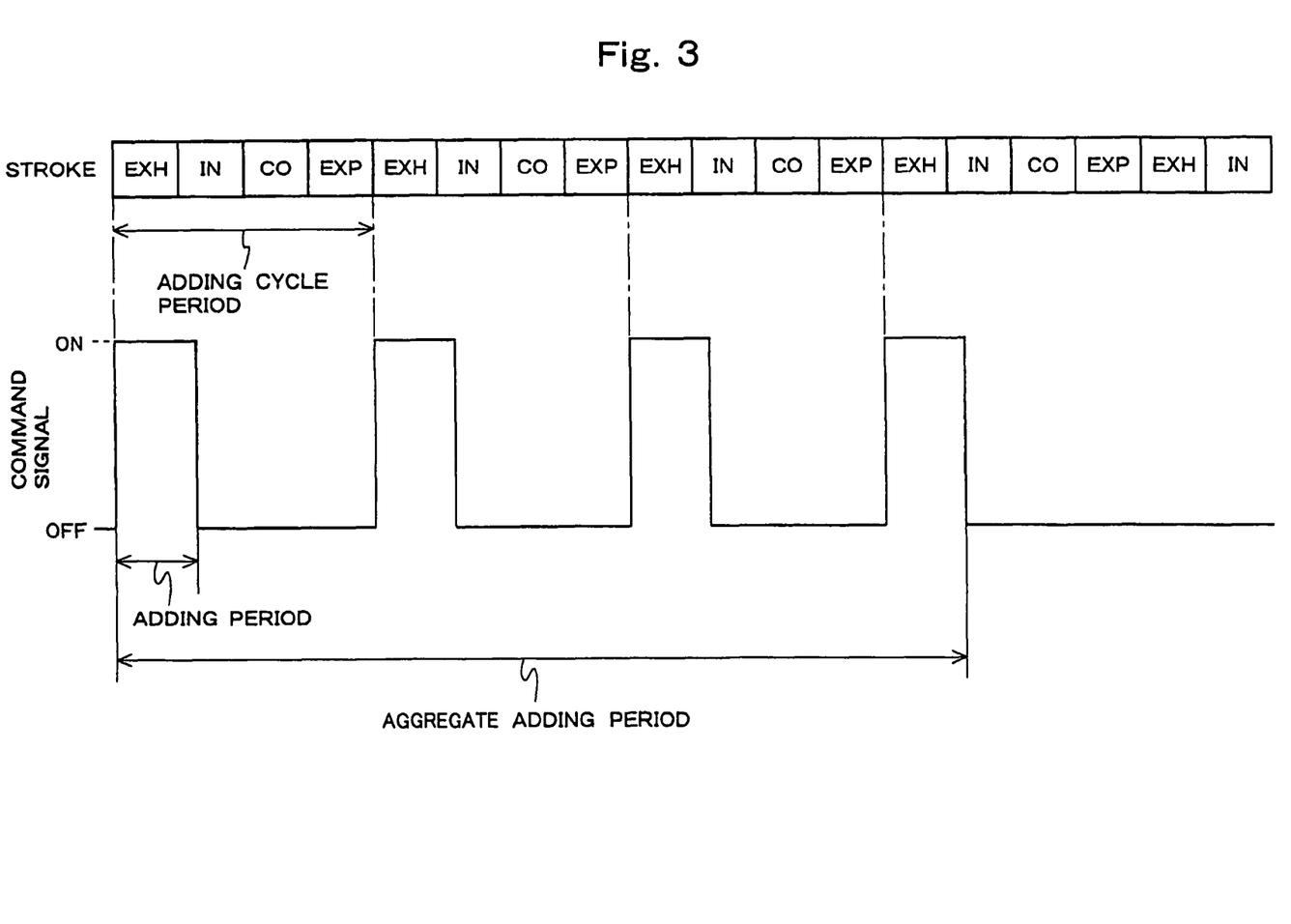
FIG. 3 is a diagram that shows a relationship between times when additions of fuel are performed and the combustion strokes in a cylinder No. 4 while a rich spike control is being performed.

Furthermore, in the rich spike control according to the embodiment, each addition of fuel during the aggregate adding period is performed in synchronization with the crank angle of the internal combustion engine 1. In other words, each addition of fuel is performed when the crank angle of the internal combustion engine 1 is in a specified range that is determined in advance. Here, the timing of each addition of fuel during the aggregate adding period will be explained based on FIG. 3. FIG. 3 is a diagram that shows a relationship between the timing of each addition of fuel and the combustion strokes in a cylinder No. 4 while the rich spike control is being performed. Stroke in FIG. 3 shows the combustion strokes in a cylinder No. 4. "EXH" represents the exhaust stroke. "IN" represents the intake stroke. "CO" represents the compression stroke. "EXP" represents the expansion stroke.

As shown in FIG. 3, the adding cycle period is identical to the period of one combustion cycle (crank angle 720°). Also, the adding period includes a period when the cylinder No. 4 is in the exhaust stroke. In the embodiment, the fuel adding valve 11 is arranged on the cylinder No. 4 side of the exhaust manifold 7. In this case, placing the fuel that is added by the fuel adding valve 11 into the flow of the exhaust gas that is discharged from the cylinder No. 4 makes it possible for the fuel to reach the NOx catalyst 10 efficiently. Accordingly, the specified range of the crank angle is set to a range that includes the Period when the cylinder No. 4 is in the exhaust stroke and a range in which it is easy to place the fuel that is added by the fuel adding valve 11 into the flow of the exhaust gas that is discharged from the cylinder No. 4.

In the fuel adding valve 11, clogging sometimes occurs due to fuel adhesion and the like. When this sort of clogging of the fuel adding valve 11 occurs, the amount of the fuel that is added by the fuel adding valve 11 per unit time (hereinafter called the "unit added amount" while the rich spike control is being performed decreases. In this case, the amount of fuel that is added to the exhaust gas during the adding period is less than it in a case where the clogging of the fuel adding valve 11 has not occurred, so the air-fuel ratio in the exhaust gas during the rich period becomes higher.

In the embodiment, a standard value for the adding period (hereinafter called the "standard adding period") is set such that the air-fuel ratio in the exhaust gas during the rich period reaches the target air-fuel ratio in a case where the rich spike control is performed with the fuel adding valve 11 in a state in which the clogging has not occurred. Accordingly, in a case where the rich spike control is performed with the fuel adding valve 11 in a state in which the clogging has occurred and with the adding period set to the value of the standard adding period, the air-fuel ratio in the exhaust gas does not lower to the target air-fuel ratio during the rich period. This results in a decrease in the fuel that is supplied to the NOx catalyst 10 while the rich spike control is being performed and creates concern that the NOx that is stored in the NOx catalyst 10 will not be sufficiently reduced.

Accordingly, in the embodiment, in the case where the clogging of the fuel adding valve 11 has occurred, the adding period is made longer than the standard adding period. This makes it possible to lower the air-fuel ratio in the exhaust gas further during the rich period.

However, in the embodiment, the adding period is set to the time when the crank angle of the internal combustion engine 1 is in the specified range, as described above. In other words, the length of the period during which the crank angle of the internal combustion engine 1 is in the specified range serves as an upper limit value for the adding period. Moreover, there are cases where the air-fuel ratio in the exhaust gas does not reach the target air-fuel ratio, even if the adding period is extended to the upper limit value.

In this sort of case, in the embodiment, the suspension period is shortened and the number of times for creating the rich period is increased, compared to when the rich spike control is performed with the fuel adding valve 11 in the state in which the clogging has not occurred.

Increasing the number of times for creating the rich period makes it possible to increase the amount of fuel that is supplied to the NOx catalyst 10 during the performance of the rich spike control, even in a case where the air-fuel ratio in the exhaust gas does not reach the target air-fuel ratio during the rich period. It is thus possible to reduce more of the NOx that is stored in the NOx catalyst 10. Furthermore, shortening the suspension period makes it possible to suppress a lengthening of the period during which the rich spike control is performed, which lengthening is attributable to the increase in the number of times for creating the rich period.

Here, a method for judging, according to the embodiment, whether or not the clogging of the fuel adding valve 11 has occurred will be explained. When a judgment will be made as to whether or not the clogging of the fuel adding valve 11 has occurred, fuel is supplied to the oxidation catalyst 9 by using the fuel adding valve 11 to add fuel for a specified period. During this time, the larger the amount of fuel that is supplied to the oxidation catalyst 9, that is, the larger the amount of fuel that is added by the fuel adding valve 11, the more the temperature of the oxidation catalyst 9 will rise. Accordingly, the unit added amount for the fuel adding valve 11 is calculated based on the amount that the temperature of the oxidation catalyst 9 rises during this time. If the calculated unit added amount is less than a standard unit added amount, the clogging is judged to have occurred in the fuel adding valve 11.

Here, the standard unit added amount is the unit added amount when the clogging of the fuel adding valve 11 has not occurred. Also, the specified period may be any period in which it is possible to supply an amount of fuel whose heat of oxidation will raise the temperature of the oxidation catalyst 9 to a certain extent. The specified period may also be comparatively short.

Figure 4:
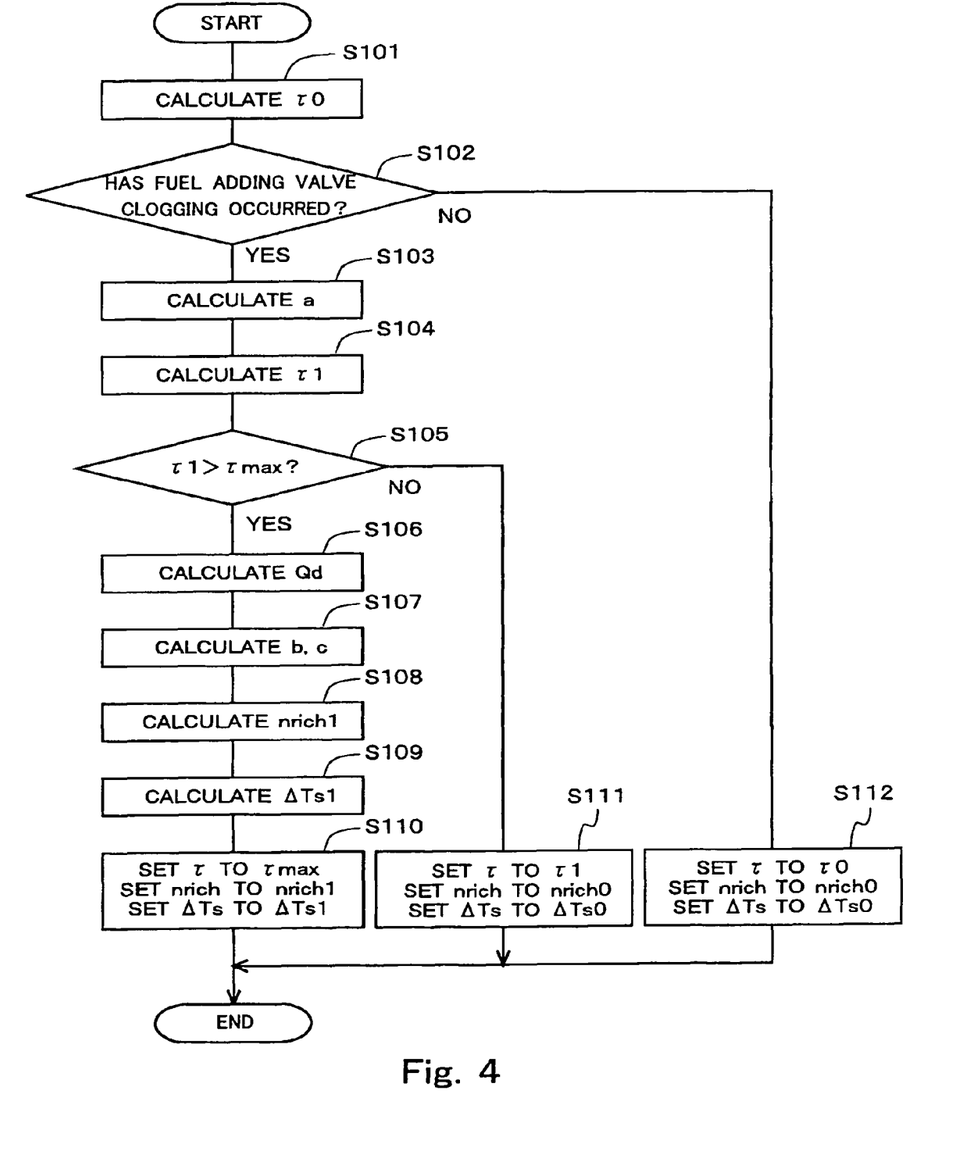
FIG. 4 is a flowchart that shows a routine for setting an adding period, a number of times that make up a rich period, and a suspension period in the rich spike control according to the embodiment.

Setting the adding period, the number of times for creating the rich period, and the suspension period A routine for setting the adding period $\tau$, the number of times for creating the rich period nrich, and the suspension period $\Delta Ts$ in the rich spike control according to the embodiment will be explained below based on the flowchart shown in FIG. 4. Note that the routine is stored in the ECU 20 in advance and is executed every time the conditions for performing the rich spike control are met. In the embodiment, the conditions for performing the rich spike control are judged to be met when the amount of the NOx that is stored in the NOx catalyst 10 becomes at least a specified stored amount. The amount of the NOx that is stored in the NOx catalyst 10 is estimated based on a cumulative total of the amounts of fuel that have been injected by the internal combustion engine 1 or on similar criteria.

In the routine, the ECU 20 first calculates the standard adding period $\tau 0$ at step S101, based on the amount of intake air, the amount of fuel injected in the internal combustion engine 1, and the target air-fuel ratio.

Next, the ECU 20 proceeds to step S102 and, by the method described above, judges whether or not the clogging of the fuel adding valve 11 has occurred. Note that the judging of whether or not the clogging of the fuel adding valve 11 has occurred may also be done in advance and the result may be stored in the ECU 20. If the judgment at step S102 is affirmative, the ECU 20 proceeds to step S103. If the judgment at step S102 is negative, the ECU 20 proceeds to step S112. Note that in the embodiment, the ECU 20 that executes the processing at step S102 corresponds to adding valve clogging judgment unit in the present invention.

When the ECU 20 proceeds to step S112, it sets the adding period $\tau$ to the value of the standard adding period $\tau 0$. In addition, at step S112, the ECU 20 sets the number of times for creating the rich period nrich to the value of a standard number of times for creating the rich period nrich0. The ECU 20 also sets the suspension period $\Delta Ts$ to the value of a standard suspension period $\Delta Ts0$. The ECU 20 then ends the routine.

Note that the values of the standard number of times for creating the rich period nrich0 and the standard suspension period $\Delta Ts0$ have been determined in advance by experimentation and the like to be values at which the NOx that is stored in the NOx catalyst 10 can be sufficiently reduced in a case where the rich spike control is performed with the adding period $\tau$ set to the value of the standard adding period $\tau 0$ and in the state in which the clogging of the fuel adding valve 11 has not occurred.

Furthermore, when the rich spike control is performed in the state in which the clogging of the fuel adding valve 11 has not occurred, with the adding period $\tau$ set to the value of the standard adding period $\tau 0$, the number of times for creating the rich period nrich set to the value of the standard number of times for creating the rich period nrich0, and the suspension period $\Delta Ts$ set to the value of the standard suspension period $\Delta Ts0$, the total amount of fuel that is added by the fuel adding valve 11 while the rich spike control is being performed is called a target total added amount.

On the other hand, when the ECU 20 proceeds to step S103, it calculates a correction factor a that is used to correct the adding period $\tau$. The correction factor a is a coefficient that can correct the adding period $\tau$ to a value such that the total amount of fuel that is added by the fuel adding valve 11 while the rich spike control is being performed will be equal to the target total added amount, in a case where the rich spike control is performed using the current unit added amount (that is, the unit added amount for the state in which the clogging of the fuel adding valve 11 has occurred) and with the number of times for creating the rich period nrich set to the value of the standard number of times for creating the rich period nrich0, and the suspension period ΔTs set to the value of the standard suspension period ΔTs0. The relationship between the correction factor a and the unit added amount is determined in advance by experimentation and the like, and is stored as a map in the ECU 20.

Next, the ECU 20 proceeds to step S104, where it calculates a corrected adding period τ1 by multiplying the standard adding period τ0 by the correction factor a.

Next, the ECU 20 proceeds to step S105, where it judges whether or not the corrected adding period τ1 is longer than the upper limit value τmax for the adding period τ. If the judgment at step S105 is Affirmative, the ECU 20 proceeds to step S106. If the judgment at step S105 is negative, the ECU 20 proceeds to step S111.

When the ECU 20 proceeds to step S111, it sets the adding period τ to the value of the corrected adding period τ1. In addition, at step S111, the ECU 20 sets the number of times for creating the rich period nrich to the value of the standard number of times for creating the rich period nrich0. The ECU 20 also sets the suspension period ΔTs to the value of a standard suspension period ΔTs0. The ECU 20 then ends the routine.

On the other hand, when the ECU 20 proceeds to step S106, it calculates a shortfall in the total added amount (hereinafter called the "added amount shortfall") Qd by subtracting the total amount of fuel that is added by the fuel adding valve 11 while the rich spike control is being performed using the current unit added amount and with the adding period τ set to the upper limit value τmax, the number of times for creating the rich period nrich set to the value of the standard number of times for creating the rich period nrich0, and the suspension period ΔTs set to the value of the standard suspension period ΔTs from the target total added amount.

Next, the ECU 20 proceeds to step S107, where it calculates a number of additional times b that, when added to the number of times for creating the rich period nrich, can compensate for the added amount shortfall Qd. In other words, a value for the number of additional times b is calculated such that, in a case where the rich period is created for the number of additional times b by performing the adding of the fuel using the current unit added amount and with the adding period τ set to the upper limit value τmax, an amount of fuel equal to the added amount shortfall Qd can be added by the fuel adding valve 11 during the number of additional times b.

At step S107, the ECU 20 also calculates a shortening period c that is used to correct the standard suspension period ΔTs0 by shortening it. A value is calculated for the shortening period c such that the standard suspension period ΔTs0 can be shortened such that the period during which the rich spike control is performed will be the same as in a case where the number of times for creating the rich period nrich is set to the value of the standard number of times for creating the rich period nrich0, even in a case where the number of times for creating the rich period nrich is increased by the number of additional times b.

Next, the ECU 20 proceeds to step S108, where it calculates a corrected number of times for creating the rich period nrich1 by adding the number of additional times b to the standard number of times for creating the rich period nrich0.

Next, the ECU 20 proceeds to step S109, where it calculates a corrected suspension period ΔTs1 by subtracting the shortening Period c from the standard suspension period ΔTs0.

Next, the ECU 20 proceeds to step S110, where it sets the adding period τ to the upper limit value τmax. At step S110, the ECU 20 also sets the number of times for creating the rich period nrich to the value of the corrected number of times for creating the rich period nrich1 and sets the suspension period ΔTs to the value of the corrected suspension period ΔTs1. The ECU 20 then ends the routine.

Note that in the embodiment, the ECU 20 that sets the adding period τ to the upper limit value τmax at step S110 and the ECU 20 that sets the adding period τ to the value of the corrected adding period τ1 at step S111 correspond to adding period lengthening unit in the present invention.

Performing the rich spike control using the adding period τ and the number of times for creating the rich period nrich that are set by the routine explained above makes it possible to control the total amount of fuel that is added by the fuel adding valve 11 while the rich spike control is being performed such that it equals the target total added amount, even in a case where the clogging of the fuel adding valve 11 has occurred. Therefore, according to the embodiment, even in a case where the clogging of the fuel adding valve 11 has occurred, approximately the same amount of fuel can be supplied to the NOx catalyst 10 as in a case where the rich spike control is performed in the state in which the clogging of the fuel adding valve 11 has not occurred. Accordingly, the NOx that is stored in the NOx catalyst 10 can be reduced to the same extent as in the case where the rich spike control is performed in the state in which the clogging of the fuel adding valve 11 has not occurred.

Furthermore, according to the routine explained above, the suspension period ΔTs is shortened to the value of the corrected suspension period ΔTs1 in the case where the number of times for creating the rich period nrich is increased to the value of the corrected number of times for creating the rich period nrich1. This makes it possible for the period during which the rich spike control is performed to be the same as in the case where the rich spike control is performed in the state in which the clogging of the fuel adding valve 11 has not occurred.

Furthermore, according to the routine explained above, in a case where the corrected adding period τ1 is longer than the upper limit value τmax, the adding period τ is set to the upper limit value τmax, and the number of times for creating the rich period nrich is increased to the value of the corrected number of times for creating the rich period nrich1. This makes it possible for the air-fuel ratio in the exhaust gas to be brought as close as possible to the target air-fuel ratio during the rich period. Accordingly, more of the NOx that is stored in the NOx catalyst 10 can be reduced, even as the number of additional times b that are added to the number of times for creating the rich period nrich is suppressed.

Note that in the routine explained above, in the case where the corrected adding period τ1 is longer than the upper limit value τmax, the added amount shortfall Qd is calculated in advance at step S106, and the number of additional times b that are added to the number of times for creating the rich period nrich is calculated as a value that can compensate for the added amount shortfall Qd. Alternatively, the number of times for creating the rich period nrich may be increased until a cumulative value for the amount of NOx that is reduced while the rich spike control is being performed, as calculated based on a detection value of the NOx concentration sensor 14, becomes equal to a cumulative value for the amount of NOx that is reduced when the rich spike control is performed in the state in which the clogging of the fuel adding valve 11 has not occurred. In a case where the number of times for creating the rich period nrich is controlled by this method, as described above, approximately the same amount of fuel is supplied to the NOx catalyst 10 as in the case where the rich spike control is performed in the state in which the clogging of the fuel adding valve 11 has not occurred.

In addition, the rich spike control according to the embodiment may be used to reduce the SOx that is stored in the NOx catalyst 10.

While the invention has been described in terms of preferred embodiments, those skilled in the art will recognize that the invention can be practiced with modifications within the spirit and scope of the appended claims.

INDUSTRIAL APPLICABILITY

According to the present invention, more of the oxide that is stored in the NOx catalyst can be reduced even in a case where the clogging of the reducing agent adding valve has occurred.

The invention claimed is:

1. An exhaust gas purification system for an internal combustion engine, comprising:
  a NOx storage reduction catalyst that is provided in an exhaust passage of said internal combustion engine;
  a reducing agent adding valve that is provided in said exhaust passage on an upstream side of said NOx storage reduction catalyst and that adds a reducing agent to exhaust gas; and
  a controller that is programmed to:
    when an oxide that is stored in said NOx storage reduction catalyst is reduced, perform a rich spike control that cyclically lowers an air-fuel ratio in the exhaust gas that flows into said NOx storage reduction catalyst to a target air-fuel ratio and that, when lowering the air-fuel ratio in the exhaust gas, perform addition of the reducing agent by said reducing agent adding valve that is performed when a crank angle of said internal combustion engine is in a specified range multiple times;
    determine whether or not a clogging of said reducing agent adding valve has occurred; and
    when the controller determines that the clogging of said reducing agent adding valve has occurred, lengthen the period during which the reducing agent is added by said reducing agent adding valve in each time when the air-fuel ratio in the exhaust gas is lowered while the rich spike control is being performed,
  wherein when the total amount of the reducing agent that is added by said reducing agent adding valve while the rich spike control is being performed does not reach the total amount of the reducing agent that is added when the rich spike control is performed in the state in which the clogging of said reducing agent adding valve has not occurred, the number of times the air-fuel ratio in the exhaust gas is lowered while the rich spike control is being performed is increased, even if the period during which the reducing agent is added by said reducing agent adding valve in each time when the air-fuel ratio in the exhaust gas is lowered while the rich spike control is being performed is lengthened to an upper limit value by said controller.

2. The exhaust gas purification system for an internal combustion engine according to claim 1, wherein
  when the number of times the air-fuel ratio in the exhaust gas is lowered while the rich spike control is being performed is increased, the increase in the number of times is such that the total amount of the reducing agent that is added by the reducing agent adding valve while the rich spike control is being performed is approximately the same as the total amount of the reducing agent that is added in a case where the rich spike control is performed in a state in which the clogging of the reducing agent adding valve has not occurred.

3. The exhaust gas purification system for an internal combustion engine according to claim 1, wherein
  when the number of times the air-fuel ratio in the exhaust gas is lowered while the rich spike control is being performed is increased, a period during which the lowering of the air-fuel ratio in the exhaust gas is suspended while the rich spike control is being performed is shortened.

* * * * *